(12) United States Patent
Hohl et al.

(10) Patent No.: US 6,445,311 B1
(45) Date of Patent: Sep. 3, 2002

(54) INDUCTIVE JOYSTICK

(76) Inventors: G. Burnell Hohl, 21 Driftway La., New Canaan, CT (US) 06840; Andrew Berton, c/o Excel Development, 1123 Mount Curve Ave., Minneapolis, MN (US) 55403-1128

(*) Notice: Subject to any disclaimer, the term of this patent is extended or adjusted under 35 U.S.C. 154(b) by 21 days.

(21) Appl. No.: 09/746,452

(22) Filed: Dec. 21, 2000

(51) Int. Cl.[7] .............................................. H03K 17/94
(52) U.S. Cl. .................... 341/20; 345/156; 200/6 A; 463/38; 74/471 XY; 336/132
(58) Field of Search ...................... 341/20; 74/471 XY; 338/154; 414/694; 200/6 A; 345/156, 161; 700/85; 336/132, 135; 463/38

(56) References Cited

U.S. PATENT DOCUMENTS

| | | | |
|---|---|---|---|
| 4,685,678 A | 8/1987 | Frederiksen | 700/85 |
| 4,855,704 A | 8/1989 | Betz | 336/132 |
| 4,879,556 A | 11/1989 | Duimel | 341/20 |
| 5,421,694 A | 6/1995 | Baker et al. | 414/694 |
| 5,598,090 A | 1/1997 | Baker et al. | 322/3 |
| 5,619,195 A * | 4/1997 | Allen et al. | 200/6 R |
| 5,791,648 A | 8/1998 | Hohl | 273/238 |
| 5,831,554 A * | 11/1998 | Hedayat et al. | 200/6 A |
| 5,911,627 A | 6/1999 | Piot et al. | 463/38 |
| 5,949,325 A | 9/1999 | Devolpi | 338/154 |

* cited by examiner

Primary Examiner—Michael Horabik
Assistant Examiner—Albert K. Wong
(74) Attorney, Agent, or Firm—Patterson, Thuente, Skaar & Christensen, P.A.

(57) ABSTRACT

A multi-dimensional position sensor includes at least three curved triangular-shaped sense inductors and a movable shaft that incorporates a conductive material. The distance of the movable shaft from the sense inductors varies as the shaft is moved in a two-dimensional plane. The variation in distance causes a variation in the inductance of each of the triangular-shaped inductors and this variation in inductance may be used to determine the physical position of the movable shaft through means of triangulation calculations.

17 Claims, 4 Drawing Sheets

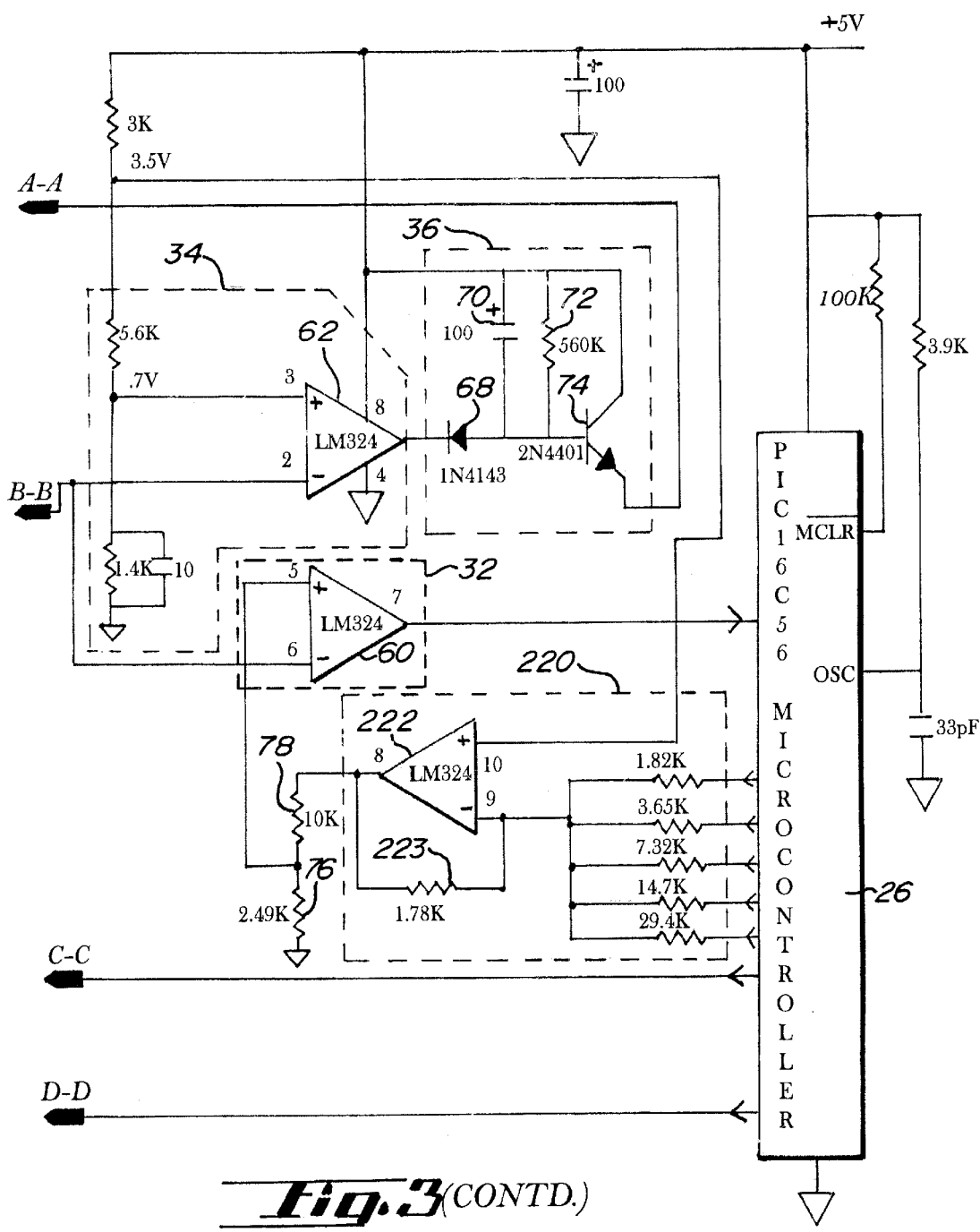
Fig. 3 (CONTD.)

INDUCTIVE JOYSTICK

FIELD OF THE INVENTION

The present invention relates to joysticks and, more particularly, to a two-dimensional position sensor using a movable shaft, incorporating a conductive material, surrounded by at least three, curved triangular-shaped sense coils. The physical position of the shaft is determined by triangulation, by detecting the change in the self-inductance of the sense coils as the shaft moves.

BACKGROUND OF THE INVENTION

Joysticks are used in many military, industrial, and commercial applications to control movement of an aircraft, vehicle, object on a video screen, etc. Most joysticks convert the angular movement of a control shaft into movement along an X and Y axis, using a mechanical linkage to translate the motion. The displacement of the shaft in each direction is detected by means of mechanical switches, variable resistors, or optical sensors. Usually the greater the resolution required in detecting the shaft position, the greater the cost of the precision sense elements, such as optical sensors, required to detect tiny changes in the shaft position.

A number of joystick systems using inductive sense elements have been developed. U.S. Pat. No. 4,685,678 describes a joystick system where position is determined through use of a pair of inductors that operate with a movable slug. The movement of the slugs, by the joystick handle, causes a change in inductance. The inductors produce signals proportional to the position of the slugs in two dimensions.

U.S. Pat. No. 4,855,704 describes a system that utilizes two induction coils, and a spherical induction body secured to the joystick. As the joystick is moved, the location of the induction body relative to the sensors changes the inductance of the sensors.

Finally, U.S. Pat. No. 5,598,090 describes a joystick system that uses biasing springs as inductors. The biasing springs position the joystick in a neutral position. Movement of the joystick compresses or extends the springs, changing their inductance. All of these approaches incorporate multiple, movable components, or mechanical elements to translate the joystick position into two dimensions.

U.S. Pat. No. 5,949,325 describes a joystick system where the joystick is secured to a conductive rubber transducer. As the joystick is moved about, the curved rubber transducer is deflected and contacts conductors on a printed circuit board. This approach eliminates many of the mechanical moving parts required to translate angular motion into two axes, however, it uses direct contact between the joystick and sensing elements.

In view of the above, there is a need in the art for a joystick with no moving parts other than the joystick shaft. Further, it would be desirable to eliminate the need to mechanically translate the motion of the shaft into an X and Y direction. It would be further desirable to detect the position of the joystick shaft without physical contact to the shaft which, in combination with the elimination of moving parts, provides improved reliability and durability. It is also desirable to detect the joystick shaft position with significant precision to provide increased resolution using low cost sensors.

SUMMARY OF THE INVENTION

The needs described above are in large measure met by an inductive joystick of the present invention. The inductive joystick has no moving parts other than the joystick shaft, and utilizes low-cost printed sense inductors. The shaft position is detected by use of a triangulation algorithm that can detect at least 72 discrete positions within the sphere of movement of the shaft. There is no physical contact with the joystick shaft.

Specifically, the inductive joystick of the present invention includes a shaft that is provided at a first end with a layer of a cone-shaped conductive material. A tubular housing surrounds the first end and contains at least three curved sense inductors that surround the movable shaft. The sense inductors are preferably triangular in shape. The distance of the movable shaft from the sense inductors varies as the shaft is moved in a two dimensional plane. The variation in distance between the conductive material and the sense inductors causes variation in the inductance of each of the triangular shaped inductors and this variation in inductance is used to determine the physical position of the movable shaft through use of triangulation calculations.

DETAILED DESCRIPTION OF THE PREFERRED EMBODIMENTS

Figure 1:
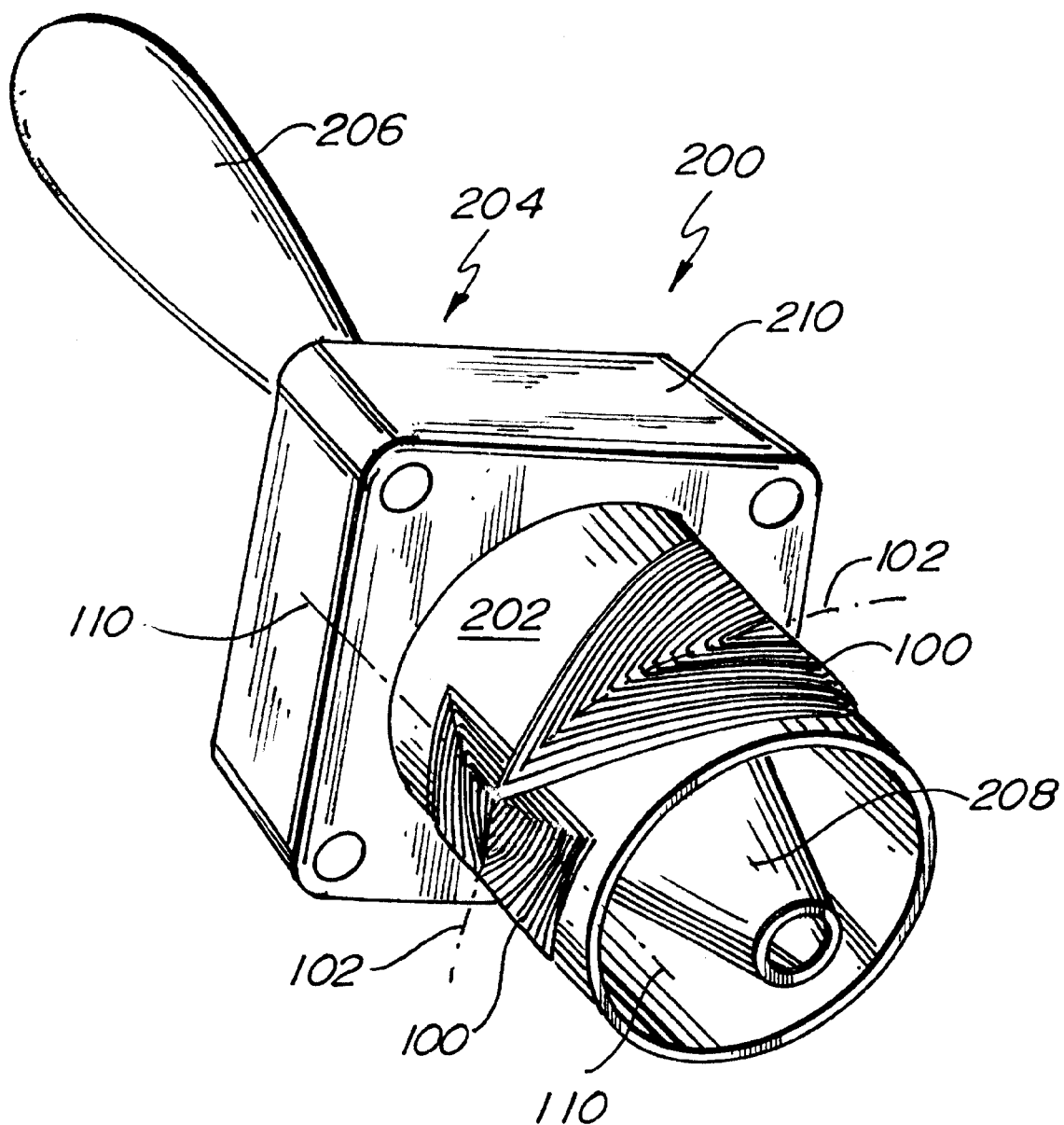
FIG. 1 is a diagram showing the construction of an inductive joystick incorporating a plurality of triangular-shaped sense coils surrounding a movable shaft fitted with a conductive cone.

Construction of an inductive joystick 200 of the present invention is shown in FIG. 1. In this particular configuration, three triangular sense coils 100 (only two may be seen) are curved about and evenly spaced around the circumference of a non-conductive cylinder 202. Each of triangular sense coils 100 is preferably printed with conductive ink, as a flex circuit, onto mylar or other suitable material that allows the coils 100 to be curved about the cylindrical shape of cylinder 202. Sense inductors 100 are triangular shaped because the self inductance of such coils varies linearly in proportion to the position of proximate conductive material along the coil axis.

It should be noted that the apex 108 of each of triangular sense coils 100 overlaps the area of the adjacent triangular sense coil 100 where the coil turns run perpendicular, designated by dashed line 110, to imaginary coil axis, designated by dashed line 102, which is the non-linear sensing portion of each triangular sense coil 100. Alternatively, a portion of each triangular sense coil 100 may be bent at a right angle, such that the non-sensing area of each triangular sense coil 100 extends perpendicularly to the side of cylinder 202 and only the linear sensing portions of each of triangular sense coils 100 are evenly spaced, without overlap, around the circumference of cylinder 202.

Cylinder 202 is maintained in a stationary position about a movable shaft 204 that is preferably comprised of a shaft handle 206 and a cone 208. Cone 208 is covered in a conductive material, preferably a highly conductive silver paint. The angle of cone 208 is such that as shaft 204 of joystick 200 is rotated about at its maximum extremity, the edge of cone 208 becomes parallel to the wall of cylinder 202. Shaft 204 is centrally supported by a base 210 that allows shaft 204 to pivot and rotate 360 degrees. Base 210 is preferably of a configuration to enable storage of the circuitry that comprises the inductive joystick sensory system.

While cylinder 202 is preferably fitted with three triangular sense coils 100, depending upon the signal strength from sense coils 100 when shaft 204 is in its idle, center position, it is usually desirable to use a fourth external coil as a reference coil (the signal strength while in the idle, center position is dependent upon the conductivity of the cone material and the diameter of cylinder 202 surrounding shaft 204). The reference coil is preferably identical in inductance to triangular sense coils 100. Alternatively, in certain configurations, any of the three triangular sense coils 100 fitted about cylinder 202 may be used as the reference coil.

Figure 2:
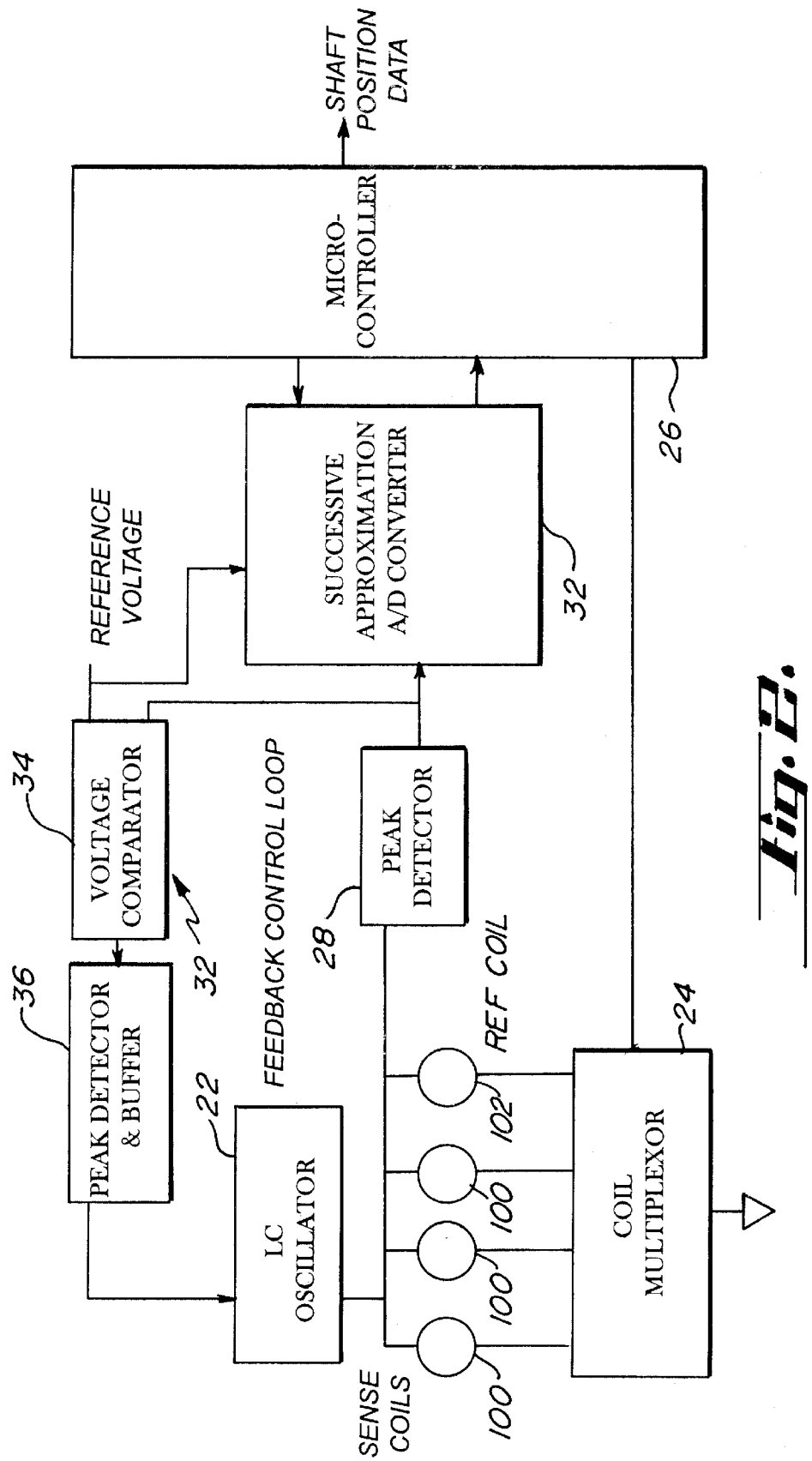
FIG. 2 is a block diagram of the inductive joystick that incorporates an inductive sensory apparatus and a microprocessor controlled successive approximation A/D converter.

FIG. 2 shows a block diagram of the inductive joystick sensory system. The three position sensing triangular sense coils 100 and one reference coil 102 are used as inductors in an LC oscillator 22 circuit. The negative excursion of the oscillator 22 output is clamped to ground and the positive peak detected by a peak detector 28, to convert the oscillation amplitude to a DC level. When the microcontroller 26 selects the reference coil 102 through a coil multiplexor 24, a feedback control loop 32 adjusts the drive voltage to the LC oscillator 22, by means of a voltage comparator 34 and peak detector/buffer 36, to clamp the signal from the reference coil to a fixed amplitude. This allows the system to compensate for changes in oscillation amplitude due to temperature, supply voltage, and component tolerance variations. The software within microcontroller 26 than samples the signals from each of the three triangular sense coils 100 which are digitized by a low cost successive approximation A/D converter 32.

Figure 3:
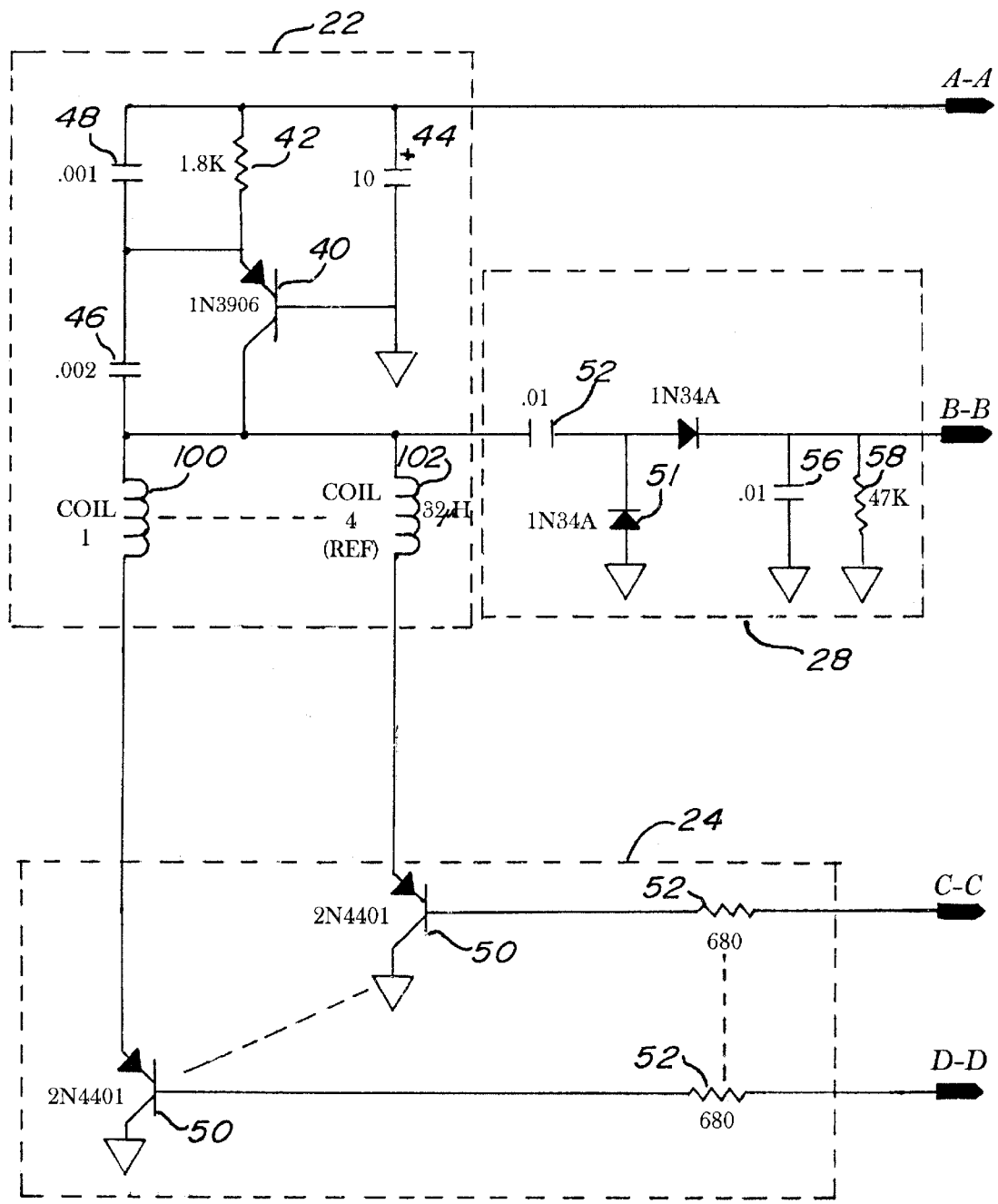
FIG. 3 is a detailed circuit diagram of the inductive joystick electronics.

Referring to the detailed inductive joystick electronic circuit diagram of FIG. 3, operational amplifier 60 forms part of the successive approximation A/D converter 32 comprising a comparator whose reference voltage is set by microprocessor 26, through a D/A converter 200. D/A converter 220 utilizes a summing amplifier 222, feedback resistor 223, and a precision resistive ladder network 224. The microcontroller 26 outputs digital words to the inputs of precision resistive ladder network 224 feeding summing amplifier 222 using a binary search algorithm until the output of the D/A converter matches the coil signal. The software of microcontroller 26 triangulates the position of shaft 204 by comparing the digitized signals from each of the three triangular sense coils 100 against a stored table of nominal signal values for various shaft positions, and runs a closeness of fit algorithm to determine the current position of shaft 204. The purpose of the closeness of fit algorithm is to find the nominal shaft position which most closely matches the measured coil signals with minimal error. The position of shaft 204 may then be output by microcontroller 26 to control a video game, machine, etc. It is possible to detect at least forty-eight (48) discrete positions around the perimeter of the largest circle circumscribed by the rotation of shaft 204 of joystick 200, with a proportional number of intermediate positions also detectable.

The inductive nature of operation of joystick 200 provides desirable advantages over that of mechanical, resistive, or optical joystick approaches. Specifically, joystick 200 provides excellent resolution at low cost and high reliability because there are no moving parts other than center shaft 204, and sensing of the joystick position requires no mechanical or physical contact with center shaft 204.

An alternative embodiment of joystick 200 comprises mounting three triangular sense coils 100 around the surface of an inverted cone surrounding shaft 204. In this case, the conductive portion of shaft 204 can be cylindrical in shape, rather than cone shaped; the operation of joystick 200 remains as substantially described above.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed:

1. A multi-dimensional position sensor, said sensor comprising:

at least three curved triangular-shaped sense inductors;

a movable shaft containing a conductive material, wherein said at least three curved triangular-shaped inductors are fixedly positioned about said movable shaft, and wherein a distance of said movable shaft from said at least three triangular-shaped sense inductors varies as said movable shaft is moved in a two-dimensional plane, the variation in distance causing a variation in the inductance of each of said at least three triangular-shaped sense inductors, said variation in the inductance usable to determine a physical position of said movable shaft.

2. The sensor of claim 1, wherein said movable shaft comprises a handle and a conductive cone.

3. The sensor of claim 1, wherein said conductive material comprises a silver paint.

4. The sensor of claim 2, wherein said at least three curved triangular-shaped sense inductors are mounted to a cylinder that is fixedly positioned about said movable shaft.

5. The sensor of claim 4, wherein said at least three triangular-shaped sense inductors are equidistantly spaced about said cylinder.

6. The sensor of claim 4, wherein said at least three triangular-shaped sense inductors incorporate a non-linear sensing portions, and wherein said at least three triangular-shaped sense inductors are mounted proximate one another such that said non-linear sensing portion of each of said at least three triangular-shaped sense inductors overlaps at least one of the adjacent triangular-shaped sense inductors.

7. The sensor of claim 1, wherein said movable shaft comprises a handle and a conductive cylinder, and wherein said at least three curved triangular-shaped sense inductors are mounted to a cone that is fixedly positioned about said movable shaft.

8. A multi-dimensional position sensor, said sensor comprising:

a reference sense inductor;

a plurality of curved triangular-shaped sense inductors;

a movable shaft containing a conductive material wherein said plurality of triangular-shaped sense inductors are fixedly positioned about said movable shaft;

an oscillator connectable to said reference sense inductor and said plurality of triangular-shaped sense inductors;

a comparator, wherein upon said oscillator being connected to each of said plurality of triangular-shaped sense inductors, a state of each of said plurality of triangular-shaped sense inductors is compared by said comparator against a plurality of precision thresholds to determine the change in inductance of said plurality of triangular-shaped sense inductors, wherein the change in inductance of said plurality of triangular-shaped sense inductors corresponds to a position of said movable shaft.

9. The sensor of claim 8, further comprising an analog-to-digital converter, wherein said analog-to-digital converter digitizes said state of each of said plurality of triangular-shaped sense inductors, wherein the digitized states are usable to determine the position of said movable shaft.

10. The sensor of claim 8, wherein said movable shaft comprises a handle and a conductive cone.

11. The sensor of claim 8, wherein said conductive material comprises a silver paint.

12. The sensor of claim 10, wherein said at least three curved triangular-shaped sense inductors are mounted to a cylinder that is fixedly positioned about said movable shaft.

13. The sensor of claim 12, wherein said at least three curved triangular-shaped sense inductors are equidistantly spaced about said cylinder.

14. The sensor of claim 12, wherein said at least three triangular-shaped sense inductors incorporate a non-linear sensing portions, and wherein said at least three triangular-shaped sense inductors are mounted proximate one another such that said non-linear sensing portion of each of said at least three triangular-shaped sense inductors overlaps at least one of the adjacent triangular-shaped sense inductors.

15. The sensor of claim 8, wherein said movable shaft comprises a handle and a conductive cylinder, and wherein said at least three curved triangular-shaped sense inductors are mounted to a cone that is fixedly positioned about said movable shaft.

16. The sensor of claim 9, wherein the digitized states are usable to determine the position of said movable shaft through use of triangulation calculations.

17. The sensor of claim 16, wherein said triangulation calculations include comparison of the digitized states with a table of nominal states for a plurality of discrete shaft positions, and determination of the nominal state of the shaft position that most closely matches the digitized states with minimum error.

* * * * *